Figure 1:
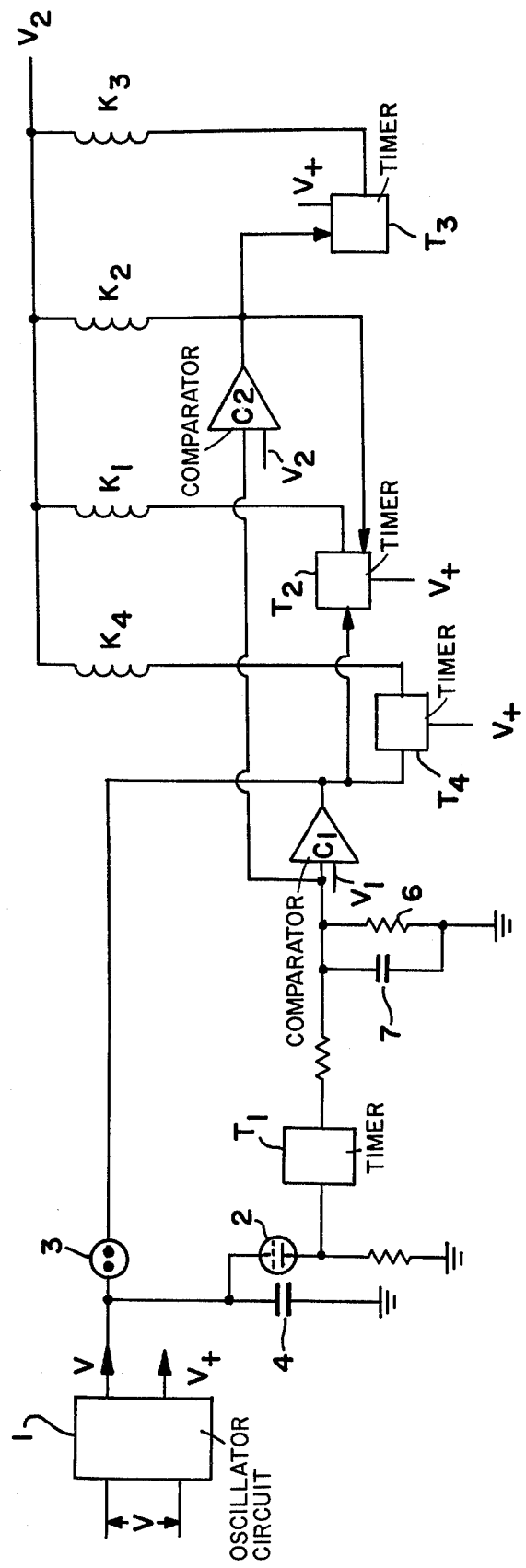

United States Patent [19]
Larsen et al.

[11] 4,027,164
[45] May 31, 1977

[54] CIRCUITRY FOR CONTINUALLY MONITORING RADIATION DETECTION SYSTEMS

[75] Inventors: Theodore E. Larsen, Edina; Stanley S. Kintigh, Hopkins, both of Minn.

[73] Assignee: Detector Electronics Corporation, Edina, Minn.

[22] Filed: May 14, 1975

[21] Appl. No.: 577,420

[52] U.S. Cl. .................................. 250/372; 250/205
[51] Int. Cl.² ................................................ G01J 1/42
[58] Field of Search .................... 250/372, 373, 205

[56] References Cited
UNITED STATES PATENTS

| | | | |
|---|---|---|---|
| 3,360,650 | 12/1967 | Lawrence | 250/205 X |
| 3,427,458 | 2/1969 | Parfomak et al. | 250/205 |
| 3,517,167 | 6/1970 | Bell | 250/205 X |
| 3,519,879 | 7/1970 | Ogawa | 250/205 X |
| 3,543,260 | 11/1970 | Engh | 250/372 X |
| 3,755,799 | 8/1973 | Riccardi | 250/372 X |
| 3,903,422 | 9/1975 | Buhrer | 250/372 X |

*Primary Examiner*—Archie R. Borchelt
*Attorney, Agent, or Firm*—James R. Cwayna

[57] ABSTRACT

Improved circuitry or systems for the continual testing of the ability of a radiation detection system to detect radiation whether the radiation source being used for the testing is located externally to or is located within the same housing as the radiation detector. The improvement includes means for maintaining a constant voltage upon a control member which means provides accomodation for random or spurious radiation by controlled excitation of a radiation source which provides means for monitoring this radiation source for automatically determining the operational condition of the radiation detector.

6 Claims, 2 Drawing Figures

CIRCUITRY FOR CONTINUALLY MONITORING RADIATION DETECTION SYSTEMS

FIELD OF THE INVENTION

Circuitry for the automatic and continual testing of the operational capabilities of a radiation detection device which circuitry provides accomodations for the presence of random or spurious sources of radiation and which also provides means for determining the operational functions of the testing source to determine whether the detection unit is properly functional.

BACKGROUND AND OBJECTS OF THE INVENTION

Radiation detectors, particularly those that are responsive in the ultraviolet range, are useful as fire detectors in certain applications. This is due to the fact that the flame from a fire generates radiation that includes the ultraviolet region of the spectrum. The middle ultraviolet, in the range of 2000 to 2800 Angstroms, is not generally present in sunlight as it reaches the earth's surface but is well transmitted through air. The extreme or far ultraviolet, in the range of 100 to 2000 Angstroms, connects the ultraviolet and X-rays and is not transmitted through air. The useful range for the detection of radiation from fires, is, therefore in the middle ultraviolet, and detection equipment employing detectors with a peak response at approximately 2100 Angstroms has been in use for a number of years. These detectors will also respond to high energy radiation of other frequency levels, particularly that known as cosmic radiation.

Detectors of ultraviolet radiation commonly consist of metal electrodes sealed in an enclosure arranged to receive radiation of the desired intensity and which enclosures contain one or more readily ionizable gases. When radiation strikes this detector, and the radiation is of sufficient energy, the impedance of the detector will change and allow the transmission of current. Obviously the measure of this current flow will be significant to the amount of radiation received. Such detectors are known to have several modes of failure and various yesting arrangements have been developed to determine whether or not the same and their associated circuitry is capable of responding to radiation from a fire. Many of these testing systems have shortcomings in their useage and in order to overcome these problems, it has been found that the mounting of a source of radiation, in the proper range of emission, integrally with the detection unit is a partial approach to the reduction of tube failure problems and such units are well known in the art. However, this mounting does not provide for a solution to thorough, continuous and proper monitoring of all the various modes of failure of the system.

Applicants' invention is particularly related to improvements in systems for the continual monitoring of radiation detection systems and more particularly those useable in the ultraviolet region, whether the monitoring source of radiation is located externally to the radiation detector enclosure or whether the source of radiation is located within the same housing.

It is therefore an object of applicants' invention to provide a testing system and the associated circuitry for a radiation detection system which is functional and operable whether the source of radiation is positioned externally to the housing for the detection unit or the source of radiation is arranged within the same housing as the detection unit.

It is a further object of applicants' invention to provide a monitoring system and associated circuitry therefore which includes means for maintaining an actuation level of operation for the unit which compensates for outside radiation or spurious discharge factors.

It is a further object of applicants' invention to provide a constant and continuous monitoring system for a radiation detection system which includes a source of radiation and the controls therefore which are responsive to radiation being received by the detection unit.

It is still a further object of applicants' invention to provide a radiation detection unit which includes a controlled source of radiation and wherein the actuation of the source of radiation is monitored.

Figure 2:
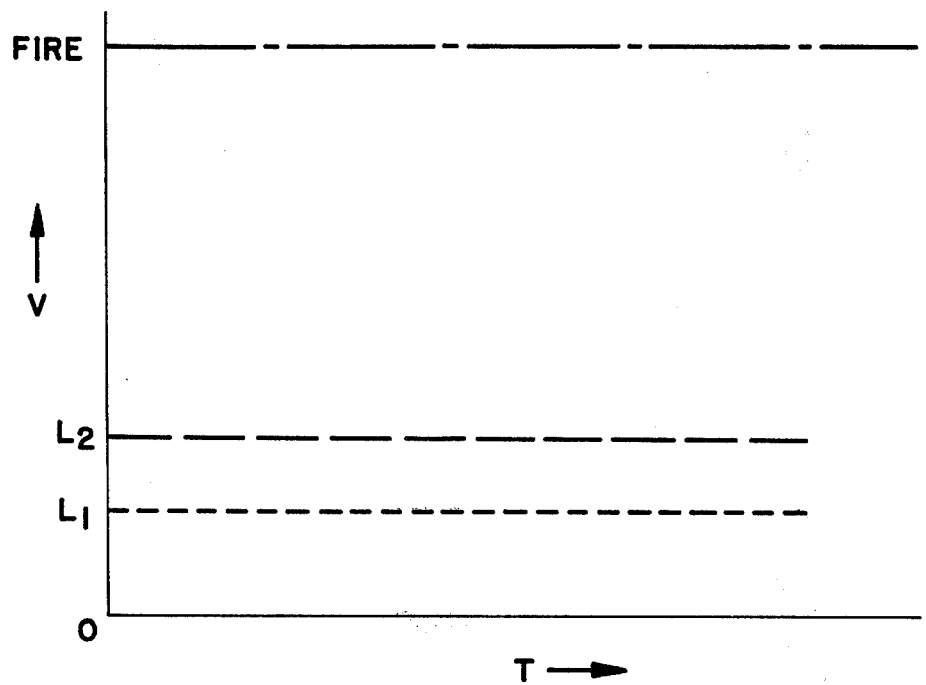

These and other objects and advantages of applicants' invention will more fully appear from the following description, made in connection with the accompanying drawings, in which the same numerals are utilized for the same or similar parts throughout the several views, and in which:

FIG. 1 is a schematic illustration of a radiation detection circuit embodying the concepts of applicants' invention; and, FIG. 2 is a graphical illustration of the responsive situations for which the circuitry provided through applicants' invention is designed for operation.

In a consideration of the accompanying drawings, and particularly FIG. 1 which is a schematic illustration of a total possible fault, alert and alarm arrangement for a radiation detection unit, it must be considered that various alternatives may be included for the indications of these situations without departing from the scope of the invention.

FIG. 2 is an illustration of the radiation being received and the resultant voltage being generated and transmitted due to response of the radiation detection device and basically represents a plot of time versus voltage transmitted. In the form shown, a base mode of operation is indicated by levels L1 and L2 and the area between these levels is indicative of voltages induced in the system by a provided radiation source when such voltages are not generated by random or spurious sources.

Above this base band, a fire level is indicated and this representation is set forth to reflect the amount of voltage transmission that will result in the circuit upon the instance of a fire. The area between indicated level L2 and the fire level may be termed a safety factor and this safety factor takes into consideration various factors of radiation and voltage transmission. For effective operation of any unit directed to the detection of radiation from a fire, it is necessary that the unit be able to discriminate from such superfluous sources and an actual fire.

One source of voltage transmission may be due to what may be termed a run-away mode of operation of the detection unit. The prior art does not provide a positive means of continually monitoring such a situation other than possibly reading the output of the detection unit and the operator or controller of the unit may be warned of the fire level, when in actuality the cause of the situation is the self-excitation of the detection unit. This could result in costly and highly undesirable conditions and results and it is a most important aspect of applicants' invention to determine this condition prior to its happening and to alert the operator or controller of this situation.

Therefore, in a description of the operative arrangement of components of FIG. 1, reference must be made to the base mode of operation of FIG. 2.

FIG. 1 illustrates, in schematic form, a means to realize the objects of applicants' invention.

An oscillatory circuit or the like is designated 1 and is provided to convert an initial input to an operative level of about 300 V.D.C. and at least one other useable voltage level for use within the circuit. These levels are respectively identified as V and V+. Obviously the level of 300 V.D.C. is a selected voltage and should not be considered to be controlling. Applicants have also illustrated a total unit which includes this conversion circuitry and the same should not be considered to be controlling. The basis for this operative level is to allow for the necessary operation of the various units employed by applicants.

The output from the conversion circuitry, which may also be termed the input to the radiation detection circuitry is directed to both a radiation detection device 2 and a source of radiation 3. For clarity, the detection device 2 is designated as a sensor and the source 3 is designated as a source.

Commonly, the impedance of the sensor 2 will be very high during periods when it is not being excited by the presence of radiation. Upon radiation of sufficient energy striking the sensor 2, the impedance thereof will drop to a relatively low value and a voltage is generated in associated circuitry which voltage is proportional to the magnitude of radiation striking the sensor.

In the situation in which no radiation is striking sensor 2, no passage of current will result through the detection portion of the circuitry and as represented in FIG. 2, a transmission voltage level below L1 would exist.

The level of voltage generated below L1 may represent any one of several conditions. These situations could include the blockage of the path along which radiation would normally be transmitted, a total failure of the sensor 2 to respond to radiation being transmitted, a failure of any of several circuit components or the failure of the source of radiation 3. The operation of the various following components of the circuitry in this particular low level transmission situation will be discussed hereinafter.

Upon radiaton striking the sensor 2, a voltage pulse is generated and this voltage pulse is directed through a conversion circuit designated T1. Although this device may take many forms, one common method of conversion is to provide T1 as a monostable "one-shot" which provides a square wave or voltage of fixed magnitude and duration. The output from converter T1, in the form shown, is then directed to a resistor, capacitor combination, designated respectively 6, 7. Capacitor 7 performs as an integrating capacitor and the voltage developed thereacross is dependent upon the frequency of the pulses and the time or duration that such pulses have been impressed thereon.

A comparator or amplifier C1 is provided to be responsive to the voltage thus generated. It should be noted that as a comparative measurement, a voltage V1 is also applied to comparator C1. If the voltage generated, in the form shown, is below the level of the preselected value of V1, the comparator C1 will permit energizing flow to the radiation source 3. Upon such energization, radiation will be emitted from source 3 and the sensor 2 will, in response to this radiation, permit current flow therethrough to bring the generated voltage level and therefore the level of comparator C1 to a state which will terminate excitation of source 3.

At this point, a comparison of FIG. 2 with the above operative description should be made. The base mode, the area between L1 and L2 represents the total transmission provided by sensor 2, which transmission is due to the presence of random or spurious radiation plus radiation from source 3. In order to maintain this base mode, for any particular period of time, it is expected and predetermined that the source 3 will be excited or in an "on" condition a certain number of times within a given time period. This is termed the "duty cycle" of source 3. In normal operation, this duty cycle causes a high percentage of discharges of sensor 2.

If the duty cycle of the source 3 drops below a preselected percentage or rate of the established duty cycle, it is obvious that the detector 2 is transmitting due to a factor which is above the spurious or random transmission and which may be due to a detector or sensor which is tending toward a run-away mode. It is necessary to understand that this undesirable condition may be identified even though the base mode of operation is being maintained and the sensor 2 is not transmitting above the L2 level.

In this situation and to provide monitoring therefore, a time T4 or other counting device is provided.

It should be obvious that this unit, T4, does not necessarily require a timing decision and other units may be provided that would be capable of determining the percentage of operation of sensor 2 caused by source 3. In the situation shown, timer T4 is energized upon the de-energization of the source 3. If after a period of preselected time, source 3 is not or has not been energized, which is representative of a preselected drop in the expected duty-cycle of the source, relay K4 is actuated. This actuation may trigger any type of alerting mechanism but the primary concern with such triggering is the indication that even though the base mode of operation for the unit is being maintained, this level is being maintained without the proper operation of source 3. This may be representative of a run-away or self excited sensor 2, or of discharge of sensor 2 due to radiation such as the UV component of solar radiation to which the sensor is normally insensitive.

This arrangement then allows the unit to operate in what may be termed the base mode while indicating that the base mode is being maintained even though a factor, source 3, which is normally required to maintain this mode, is not being energized as normally required.

The condition of no transmission through the sensor 2 results in the following operation. If the voltage level, in the circuitry shown, on capacitor 7 has been at a low value due to no transmission, comparator C1 has been continually exciting the source 3. The reasons for such low transmission have been previously stated. Timer T2 is energized and if this excitation condition to source 3 is allowed for a predetermined period of time, relay K1, capable of alert actuation will be denergized.

In an actual fire situation, applicant illustrates an alternative situation with relays K2, K3 and comparator C2. In the form shown, if the voltage generated across capacitor 7 is above a predetermined level as determined by V2 applied to comparator C2, relay F2 and an associated alarm may be actuated. This situation will provide for automatic alert whenever the voltage across the capacitor 7 exceeds a limit as determined by the impressed voltage V2 across comparator C2. This may be further controlled by utilizing a combination of timer T3 with this circuitry. Should comparator C2 allow the actuation of relay K2, timer T3 will likewise be actuated and should this signal continue across comparator C2 for a preset period of time, relay K3 may be actuated to definitely state the presence of fire.

Applicant has provided a unique control circuitry for utilization with a radiation detection device which includes a means for maintaining a base level of operation for a detector or sensor of radiation by accommodating for random or spurious radiation and including means for determining the operation of a source of radiation and determining the operation thereof to provide a positive checking system to determine the mode of operation and transmission of a radiation detection element.

What I claim is:

1. Circuitry for continually monitoring radiation detection systems including:
    a. a radiation detection unit arranged and constructed to generate a signal in response to radiation striking the same;
    b. a source of radiation arranged to emit radiation to strike said radiation detection unit;
    c. control means including signal comparing means receiving the signal from said detection unit, said control means arranged to excite said radiation source at a first predetermined level of said signal and terminating excitation of said radiation source at a second predetermined level of said signal;
    d. means for providing a predetermined control signal to said signal comparing means of said control means; and,
    e. means for determining the operative state of said source of radiation.

2. The structure as set forth in claim 1 and said operational determination means including readout means.

3. The structure as set forth in claim 2 and said readout means being controlled by said determination means and being actuated thereby.

4. The structure as set forth in claim 3 and said determination means being responsive to a predetermined actuation condition of said radiation source.

5. The structure as set forth in claim 1 and said determination means including a counter and timer arrangement, said counter and timer arranged and constructed to compare the actuation level of said radiation source to a preselected actuation level.

6. The structure as set forth in claim 5 and said determination means actuating said readout means when the actuation level of said radiation source is at a predetermined level below said preselected actuation level.

* * * * *